United States Patent [19]

Cavigelli

[11] 4,261,032

[45] Apr. 7, 1981

[54] HIGH VOLTAGE CRT SUPPLY

[75] Inventor: George A. Cavigelli, Lexington, Mass.

[73] Assignee: American Optical Corporation, Southbridge, Mass.

[21] Appl. No.: 960,367

[22] Filed: Nov. 13, 1978

[51] Int. Cl.² .............................................. H02M 3/335
[52] U.S. Cl. ........................................ 363/19; 363/97
[58] Field of Search ................................... 363/18–21, 363/97, 131

[56] References Cited

U.S. PATENT DOCUMENTS

| 3,569,779 | 3/1971 | Luursema | 363/18 X |
| 3,828,239 | 8/1974 | Nagai et al. | 363/20 |
| 3,958,168 | 5/1976 | Grundberg | 363/18 |
| 4,073,003 | 2/1978 | Chambers | 363/20 |

Primary Examiner—William M. Shoop
Attorney, Agent, or Firm—Jeremiah J. Duggan; Alan H. Spencer; Stephen A. Schneeberger

[57] ABSTRACT

A self-oscillating, high voltage DC power supply for a cathode ray tube drive. Included within the high voltage power supply are an oscillator coil connected to a DC supply and transistor switching means connected to the coil between the coil and ground so as to provide a charging circuit for the oscillator coil. Diode means and output filter are connected between the coil and the DC output to provide a smoothing of the ripple of the DC output. Included in the oscillator power supply are a feedback coil inductively coupled to the oscillator coil and wound in the opposite direction. The feedback coil is a part of a base drive circuit for the transistor switch. Included also are feedback resistance in series with the coil and these elements are connected between the base of the switching transistor and ground. The feedback coil operates to open the switch by means of current induced in the base drive circuit when the current in the feedback circuit reaches a predetermined level related to the current in the oscillator coil primary and thus the transistor. The feedback value is selected such that when the transistor switch reaches its saturation limit, it is shut down to prevent any further large currents therethrough which might damage the device and ultimately the cathode ray tube or any other components connected in the high voltage drive circuit. Preferred embodiments of the invention include high voltage regulation in conjunction with the self-oscillating DC drive.

1 Claim, 4 Drawing Figures

HIGH VOLTAGE CRT SUPPLY

BACKGROUND OF THE INVENTION

The present invention is related to high voltage power supplies for a cathode ray tube. Specific advantage is found in using the present invention in a high voltage power supply for a medical instrument wherein physiological data is displayed on a cathode ray tube.

It is desirable that the high voltage power supply used for a cathode ray tube in a display system fulfill many varied requirements. One of these characteristics is that the high voltage supply exhibit good regulation against load and line changes including quick action to prevent shifting of the image on the display on turn-on and off of functions within the instrument and additionally to prevent undue variation in the overall display size during normal operation. An additional desirable characteristic is that the high voltage supply operates at a frequency beyond twenty kilohertz so that it avoids audible noise. A further desirable feature in a supply is that minimum power dissipation in switching transistors occur to minimize the size and leak from heat sink requirements and thus to reduce the spread of high frequency, high voltage noise to sensitive portions of the overall cathode ray tube circuit. It is known that to include large heat sinking means to transistor devices increases capacitive coupling between the devices, resistors and the heat sink and thus induces the propagation of high frequency and high voltage noise throughout other circuit elements also exhibiting capacitive coupling with a heat sink device.

Additional problems are exhibited in cathode ray tube devices as well as other electronic instruments wherein during power turn-on and turn-off cycles, substantial stresses are placed upon circuit components. These occur due to the instantaneous mode of operation of circuit components during the turn-on and the resultant transients in voltage and current. These fluctuations occur within the various circuits of a system until it achieves a stabilized operating condition. While such a transient period may exist only for tenths of a millisecond or less, the existing transients may be of substantial size and put undue stress upon circuit components.

An additional problem occurring in cathode ray tube devices is caused by internal arcing of the cathode ray tube. It is known by the users of cathode ray tubes that periodic short circuits occur among one or more of the high voltage elements within the cathode ray tube. These are theorized to occur because of a build-up of either contaminants or of high electric field strengths on sharp-edged components. To varying degrees, all cathode ray tubes exhibit discharge properties when the voltage rises on various of the structural elements such as high voltage electrodes and the like and instantaneously discharge to surrounding elements. During the interval of this cathode ray tube arcing, there is a temporary short on the power supply, which places substantial stresses on the various components (transistors, integrated circuits and the like) in the supply.

I have determined that a solution to the foregoing problems is in the use of a self-oscillating fly-back converter with appropriate additional regulation of the output voltage thereof. Through this invention, the aforementioned stresses which may be occurring during the continued operation of the high voltage supply of a CRT display may be overcome to provide long and stable operation.

Conventional methods of accommodating for problems of the type indicated above and especially arcing and the short-circuit type are discussed in detail in the following two publications: "The Destructive Circuit Malfunctions and Corrective Techniques in Horizontal Deflection" by C. F. Wheatley, IEEE Transactions on Broadcast and TV Receivers, July 1965, pages 102-111 and "Flashover in Picture Tubes and Methods of Protecting" by A. Ciuciura, The Radio and Electronic Engineer, March 1969, pages 149-168.

As will be noted from the following detailed description of a preferred embodiment, the present invention involves a technique different and alternative to those described in the above-mentioned publications. It should be noted that the present invention allows a straight-forward, easily implemented technique enabling an inexpensive and uncomplicated instrumentation into a cathode ray tube display, high voltage power supply.

SUMMARY OF THE INVENTION

The present invention is directed to a self-oscillating, high voltage DC power supply for electronic apparatus such as cathode ray tubes and the like. Among the certain features of the invention forming this self-oscillating, high voltage power supply which operates as a fly-back converter are the usual DC power supply for operating the circuit, an oscillator coil connected to the power supply and solid state switching means connecting the coil to ground so as to provide a charging circuit for the coil. Additionally included are diode means connected to the coil to provide a DC output for the coil. As is conventional, additionally included are output filter means connected to the diode to smooth out the ripple of the DC output. A feedback coil inductively coupled to the oscillator coil and electrically coupled to the switch means is included with feedback resistance in series therewith and functioned to open the switch means upon the reaching of a predetermined level of current. In the feedback resistance, additionally included is catch diode means disposed in parallel with the switching means to maintain a voltage across the switch means to below a predetermined level.

In preferred embodiments, the self-oscillating fly-back converter includes means to regulate the output voltage of the high voltage power supply by including means to monitor the voltage level of the DC input power supply and comparator means to compare the output voltage with a predetermined reference value. In preferred embodiments where the switching means is a switching transistor, the means for regulating the output voltage includes a voltage-to-time converter for opening the transistor switch, the base drive circuit to control the operation of the base drive and thus the production of the output voltage. In the present mode of regulation, the output voltage may be regulated only by reducing the maximum available output voltage of the circuit which is otherwise capable of being generated without regulation.

These and other objects of the present invention will be evident from the following description of the preferred embodiments.

DETAILED DESCRIPTION OF A PREFERRED EMBODIMENT

Figure 1:
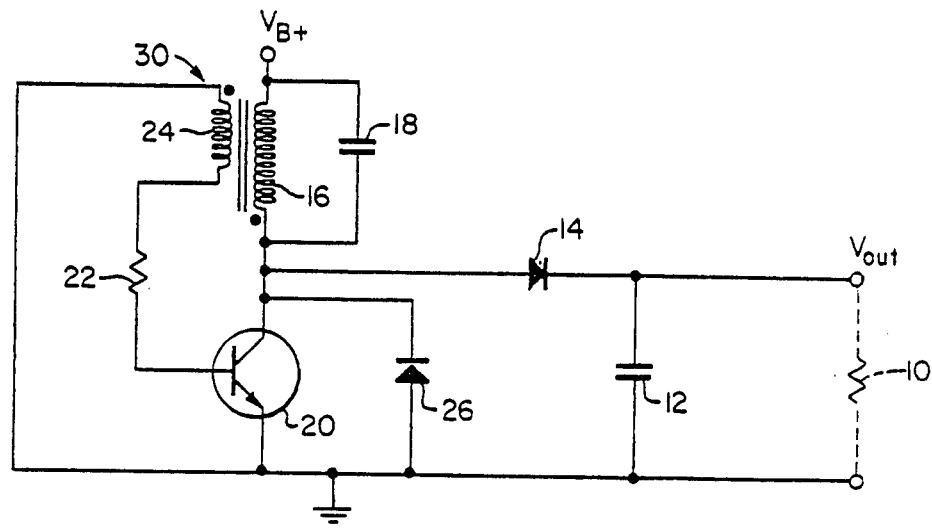
FIG. 1 is a simplified electrical schematic of the invention.

Referring now to the drawings and FIG. 1, in particular, one aspect of the invention may be understood. The high voltage power supply of the invention includes a self-oscillating fly-back converter which provides protection against overload stresses induced into the power supply by such abrupt changes of loading as the internal arcing of the cathode ray tube, turn-on or turn-off of the instrument and the like. In FIG. 1, reference numeral 10 indicates the external load of the circuit. This conventionally includes various of the internal high voltage elements of the CRT, e.g. anodes or high voltage accelerating circuits which control the electron beam of the cathode ray tube. The high voltage output to the load 10 is filtered through a capacitor 12 from a diode 14 which represents conventional practice in DC power supplies. The self-oscillating portion of the circuit includes an inductor 16, the internal stray capacitance therein 18, and both connected to a voltage B+ voltage source ($V_{B+}$).

The inductor 16 is charged through a switching device, such as transistor 20, the base of which is coupled through a feedback resistor 22, a feedback inductor 24 inductively coupled to coil 16. The switching transistor is conveniently used since it may be controlled through the base drive circuit including the coil 24 and the feedback resistor 22 to accomplish switching. A clamping diode 26 is connected across the emitter and collector of the transistor 20 to prevent the drop from going more than one diode drop negative upon shutdown of the transistor.

Figure 2:
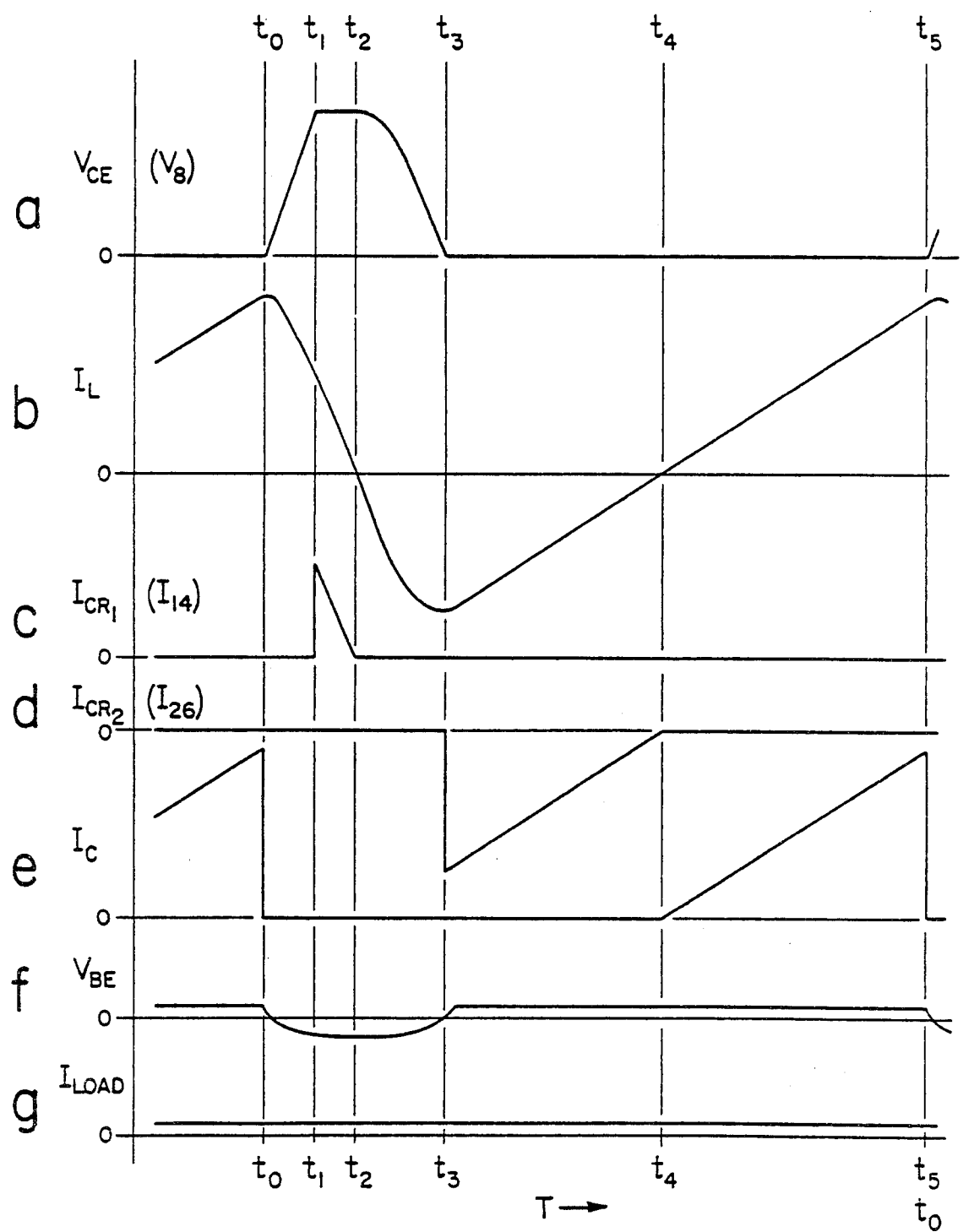
FIGS. 2a-f are voltage on current-to-time curves illustrating operation of the invention.

Referring additionally to the voltage and current curves of FIG. 2, the operation of the self-oscillating circuit may be understood. The circuit operation consists essentially of two main cycles, firstly when the diode and the transistor 20 and 26 are conducting, energy is absorbed from the B+ DC supply into the inductor 16. During the second main cycle of the circuit operation, when the diode and the transistor are open, or shut down as the case may be, energy is provided to the load resistance 10 from the collapsing field of the coil 16, as influenced by the internal stray capacitance 18 of the inductor 16.

The output voltage for a given load is determined by the design characteristics of the base drive circuit, namely, the feedback resistance and the feedback inductance.

Turning now to curves a through f of FIG. 2, operation of the self-oscillating circuit is illustrated. It will be assumed that the filter capacitor 12 is very large with respect to its impedance value as compared with the rest of the circuit element (e.g. the time constant $R_{10}C_{12} \rightarrow \infty$ with respect to the period $t_0-t_5$. At time $t_0$ on FIG. 2, it will be noted that transistor 20 has been conducting and current has flowed from ground through the transistor emitter and collector and inductor 16 to the B+ power supply. Energy stored in the system (the inductor) at this point may be expressed as:

$$P = \frac{I_L^2 \cdot L}{2} + \frac{V_b^2 \cdot C}{2}$$

At time $t_0$ and from then forward to $t_5$, the relevant circuit to be discussed consists of the inductor 16 which carries current $I_L$ and the internal stray capacitance of the windings of the inductor expressed as capacitor 18. It will be seen that capacitance 18 is in parallel with the inductor coil 16. Energy flow from the inductor 16 to the stray capacitance 18 will be in the form of a generally sinusoidal wave as is illustrated in FIG. 2b for those periods of time when the current flows in that capacitance. At time $t_0$, the transistor 20 ceases conducting for reasons to be explained subsequently in connection with the description of the base drive circuit. At such time, current flows out of inductor 16 and into capacitor 18 and results in the voltage across capacitor 18 ultimately becoming equal to or larger than the output voltage $V_{out}$. The diode 14 will then conduct, as is illustrated in FIG. 2c, and current will flow to the output to supply the load. Since the output capacitor 12 is very large, the voltage at the output will stay substantially constant. The current will be supplied to the load until the inductor current reaches a zero value. At this point in time ($t_2$) voltage across the stray capacitance 18 decreases until the absolute value of the voltage $V_c$ equals the absolute value of the voltage $V_b$. Then, the catch diode 26 conducts and current will again flow back into the power supply through the catch diode 26 and the inductor 16, in a decreasing manner until the current in the inductor reaches "zero" which is time $t_4$. At this point in time, the operation of the transistor 20 takes over to continue the current flow in the inductor 16 to return the energy level in the inductor 16 to its peak "positive" value.

The transistor 20 is switched to a conducting state by means of the base drive circuit of that transistor. The transistor is switched to the conducting mode at a time before $t_4$ in order that the inductor current $I_L$ is continuously increased through the "zero" value at time $t_4$. In the operation of the preferred circuit, the transistor 20 is actually switched to a conducting state at time $t_3$. From time $t_4$ on, inductor current $I_L$ increases above the zero value by virtue of the conduction of transistor $Q_1$ drawing energy from the B+ supply (until now current flow in the inductor was by virtue of catch diode 26).

The transistor 20 base drive current $I_b$ is determined by the voltage across the base windings 24, the value of the resistance in the base circuit 22 and the base-to-emitter voltage drop at transistor 20 ($V_{be}$). The voltage across the winding 24 is a replica (scaled down by the turns ratio n) of the voltage across the inductor 16. This inductor 24 forms the secondary of the transformer 30 including inductors 24 and 16.

When transistor 20 is switched to the conducting state, the voltage $V_b$ is applied across transformer 30 primary (inductor 16) and by transformer action the voltage $V_b/n$ is induced in secondary 24. This generates a base current $I_b$ determined by the equation:

$$I_b = \frac{\frac{V_b}{n} - V_{be}}{r_b}$$

This base current permits the transistor 20 to carry a collector current of $I_b \times \beta$ and remain in the conducting state. When the collector current increases beyond the saturation characteristic of the transistor ($I_b \times \beta$) the collector-to-emitter voltage $V_{ce}$ begins to rise ($t_0$). As this occurs, the voltage across the inductor 16 decreases and this in turn decreases the base current flowing in the transistor base circuit. This positive feedback reducing the base current accelerates the shutdown of transistor 20 to prevent overdriving thereof and possible damage of circuit components. As the transistor Q1 opens or ceases conducting, the time t has once again advanced to time $t_1$ with a current $I_L$ again flowing to the output and $R_L$. This energy is supplied through the diode 14 and in conjunction with the filter capacitor 12.

The output voltage for a given load is determined by the design of the described base drive circuit, the transistor 20 saturation characteristic and the values of the inductor 16 and the stray capacitance 18 thereof. The transistor ceases conduction when the base drive is no longer sufficient to keep the transistor 20 in saturation. By virtue of the continuous increase of collector current at the time $t_0$, the lack of feedback current causes the shutdown of transistor 20.

A part of the energy stored in the inductor 16 is supplied to the load. This occurs during time $t_1$ to $t_2$. This period of time of current supply, the size of the capacitor 12 and the total load, determines the output voltage.

It should be recognized that it may be desirable to regulate the output of the described DC supply. The output voltage $V_{out}$ can be controlled (reduced only) by a momentary diversion of the base current as during time $t_4$ to $t_5$. A temporary suppression of this base drive will switch the base drive circuit and the self-oscillating fly-back converter into the next part of the cycle with the transistor 20 and diode 26 non-conducting.

A temporary reduction of the base drive is more readily implemented without substantial degradation of the circuit efficiency. An increase of the base drive and, therefore, an increase of the output voltage by external control is much more involved and difficult to achieve, and also results in a substantial loss of efficiency. External control would also defeat the self-limiting current protection of this basic oscillator.

It should be observed that the collector current of transistor 20 ($I_c$) increases progressively and the switching action only takes place when the transistor 20 is being opened. This allows optimization of the design of the base drive circuit for low switching losses in the transistor. The dissipation in the transistor is also reduced due to the controlled rise time of the collector voltage $V_c$, due to the stray capacitance, $C_0$ (at 18).

The circuit is designed preferably such that under maximum expected load, the uncontrolled output voltage is always larger than the expected required control voltage. So long as these parameters subsist, voltage regulation by the subsequently designed circuit may be continually accomplished.

The control of the output voltage $V_{out}$ is done by a comparison of the output voltage to a reference voltage and in turn reducing the transistor 20 on time by momentarily removing the base drive. Should the range of control be large and the power system load or input voltage $V_b$ exceed the design limit, the control loop may get locked into a mode of operation locking the transistor 20 on longer than the natural period. The situation does not lend itself to simple analysis but is somewhat similar to a power supply with a current foldback as known in the art and operation under overload condition. This locked-on condition can be avoided with the regulatory system of the present invention.

Figure 3:
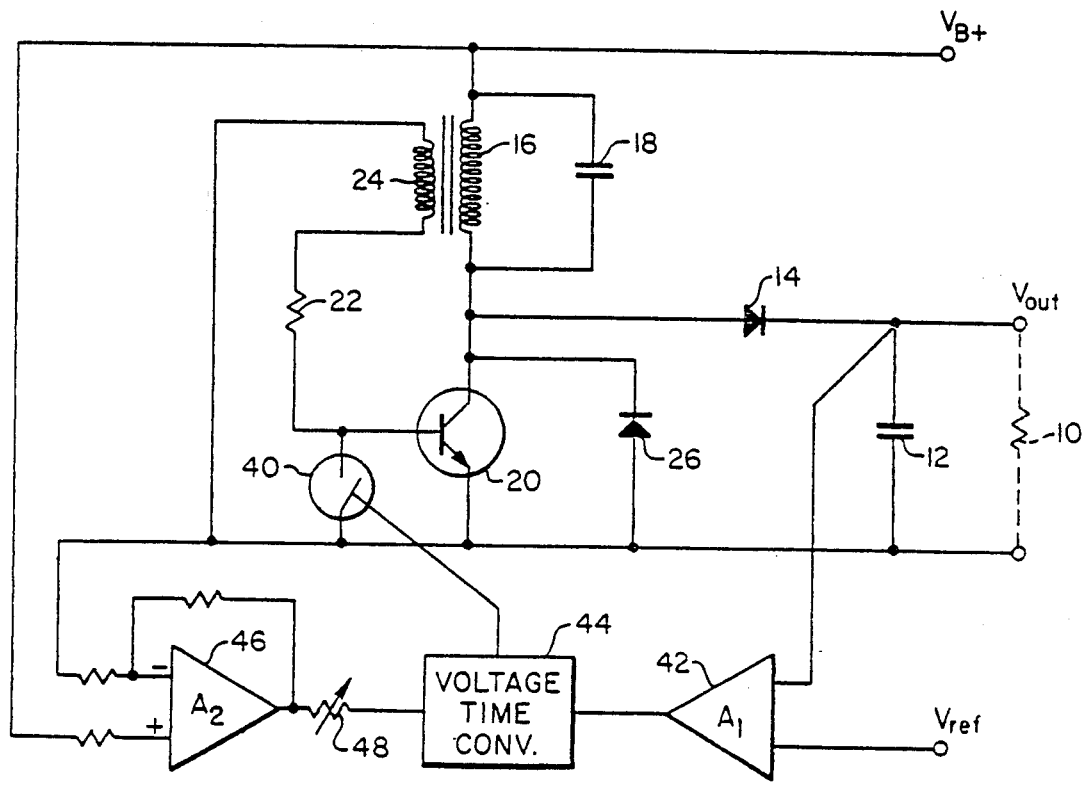
FIG. 3 is a simplified electrical schematic of the invention including self-regulation.

Referring now to FIG. 3, the invention illustrated in FIG. 1 is further illustrated with the inclusion of output voltage regulation and prevention against the "locked-on" condition for transistor 20. In FIG. 3, it will be noted that the previously described base drive circuit for transistor 20 includes now a switch 40 between the base drive circuit and ground. Also included is an error signal amplifier 42 disposed so as to compare the output voltage $V_{out}$ with a reference voltage $V_{ref}$. The output of the error signal is supplied to a voltage-to-time comparator 44. Also being input into the voltage-to-time converter is the B+ supply through amplifier 46 and trimming resistor 48 for the purpose of compensating for the variation of circuit element parameters.

The switch 40 in the base circuit of transistor 20 is conveniently a transistor switch although illustrated in the present functional diagram as a single-pole, single-throw switch. This switch 40 is controlled in response to the primary voltage B+ ($V_b$) and the error amplifier output 42. Provision is made to scale the primary voltage function to compensate for variation in waveform inductance and stray capacitance in such a way that the output voltage for a nominal load is at the proper value without any additional control. Amplifier 46 performs this function in conjunction with the voltage-to-time converter 44. Primary voltage $V_{B+}$ is monitored by amplifier 46, internally compared with system ground so that the full value of $V_b$ waveform is input to the overall system voltage control.

With the above provision, the error amplifier of 42 only now has to provide correction and timing for load variations (variation $V_{out}$). These variations are relatively small in a scientific instrument such as the present monitor or a cathode ray tube display, considering the total circulating currents in the total circuitry of the self-oscillating, fly-back oscillator (e.g. FIG. 2g). The above regulating provisions produce a high gain control loop with limited dynamic range and features that no uncontrolled mode of operation occurs even when a large input voltage and transformer variation occurs. Since the error amplifier 42 only has to monitor small currents (voltage changes) it won't "lock-on" trying to produce greater voltage control than the system can accommodate.

Figure 4:
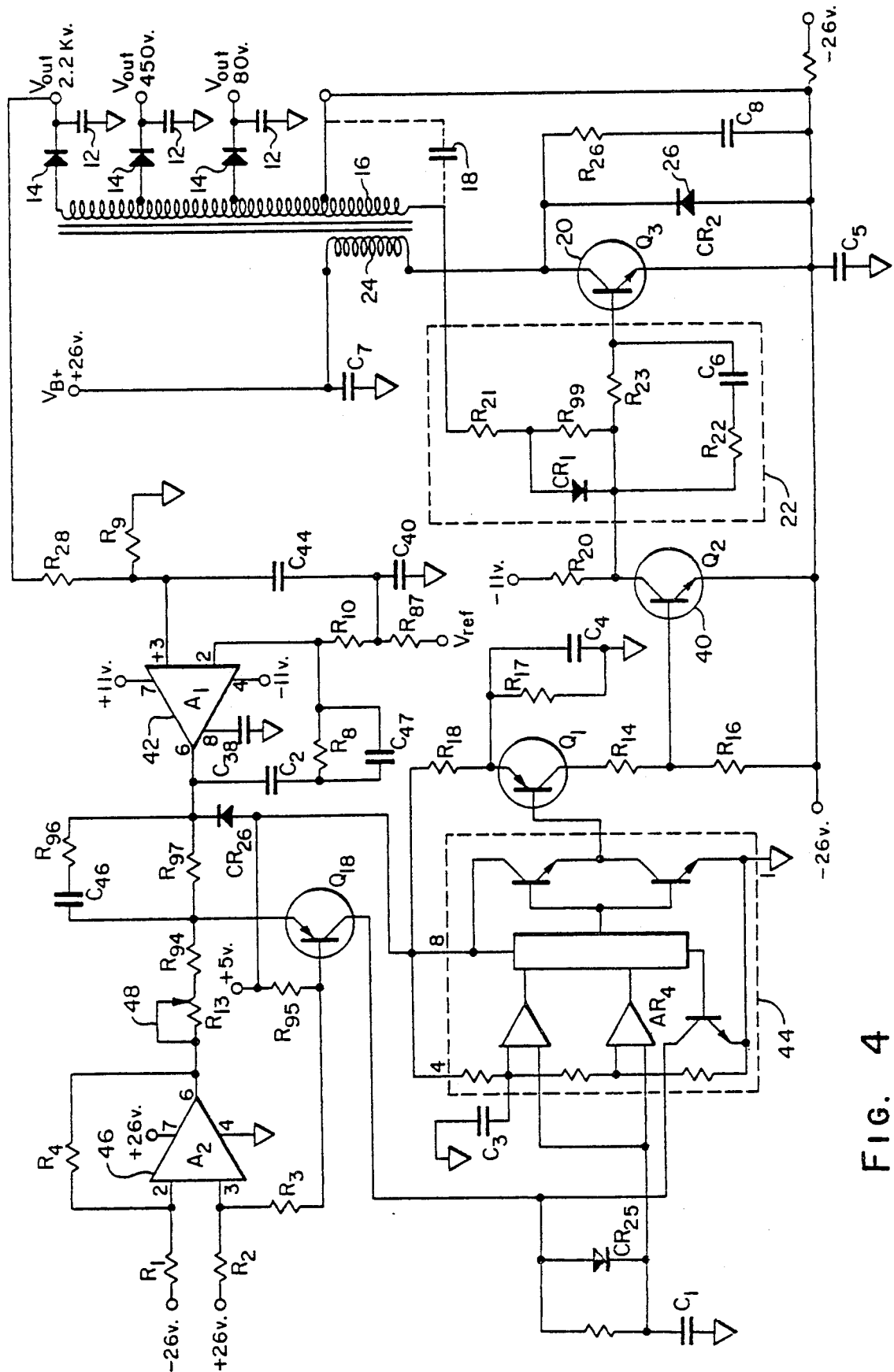
FIG. 4 is a detailed electrical schematic of a preferred embodiment of the invention.

The full embodiment of the self-oscillating fly-back converter including the regulatory provisions discussed in conjunction with FIG. 3 is illustrated in FIG. 4. In FIG. 4, reference numerals for comparable components of FIG. 3 have been utilized. Additional components which occur for trimming, filtering, input and output buffers are shown and the table of the component value is listed below.

| | |
|---|---|
| $R_1$ | 4.99K 1% |
| $R_2$ | 49.9K 1% |
| $R_3, R_4$ | 10K 10% |
| $R_{95}, R_{22}$ | 10 5% |
| $R_{13}$ | 10K var |
| $R_{94}$ | 6.81K 1% |
| $R_{96}, R_{97}$ | 3.3K 5% |
| $R_{28}$ | 50M 5% |
| $R_{10}$ | 100K 5% |
| $R_8$ | 1.8M 5% |
| $R_9$ | 118K 5% |
| $R_{87}, R_{20}$ | 18K 5% |
| $R_{11}$ | 1K 1% |
| $R_{17}, R_{18}$ | 1K 5% |
| $R_{14}$ | 1.5K 5% |

-continued

| | |
|---|---|
| $R_{16}$ | 470 5% |
| $R_{23}$ | 270 5% |
| $R_{99}$ | 47K 5% |
| $R_{26}$ | 1.8K 5% |
| $R_{24}, R_{25}$ | 22 5% |
| $R_{21}$ | 220 5% |
| $Q_1, Q_{18}$ | 2N3906 |
| $Q_2$ | 2N2222A |
| $Q_3$ | TIP 50 |
| $C_1$ | .01 mf |
| $C_2$ | 330 pf |
| $C_{46}$ | .01 mf |
| $C_{44}$ | 470 pf |
| $C_{47}$ | 5 pf |
| $C_3, C_4$ | 4700 pf |
| $C_8, C_{38}$ | 100 pf |
| $C_6$ | .068 mf |
| $C_5, C_7$ | 22 mf |
| $CR_1, CR_{26}, CR_{25}$ | 1N914 |
| $CR_2$ | 1N4936 |
| $AR_4$ | NE555V |

As was noted in the discussion of FIG. 3, switch 40 is conveniently a transistor switch and in the case of FIG. 4, it will be seen that the switch is, in fact, a 2N2222A transistor. It should also be noted that the inductor 16 is actually a multiple voltage type output step-up transformer. Such transformers are usual in cathode ray tube installations allowing multiple voltage outputs from the high voltage power supply. It will be noted that certain of the taps are utilized for greater cathode voltages as well as the high voltage accelerating potential. The inclusion of this multiple tap transformer does not effect the overall function in operation of the described invention.

While certain embodiments have been shown and described illustrating the present invention, it should be understood that the invention is not limited thereto but is susceptible in numerous changes and modifications as known to persons skilled in the art. Such additional variations and modifications as may be made without departing from the true scope and spirit of the invention are considered to be within the scope of claims appended hereto.

I claim:
1. A self-oscillating, high voltage DC power supply for electronic apparatus such as a cathode-ray tube comprising:
   a DC power supply;
   an oscillator coil connected to said power supply;
   a transistor switch connecting said coil and ground so as to provide a charging circuit for said coil;
   diode means connected to said coil to provide a DC output for said coil;
   output filter means connected to said diode to smooth the ripple of said DC output;
   a feedback coil inductively coupled to said oscillator coil and electrically coupled to said switch means, feedback resistance in series with said feedback coil and the base circuit of said transistor switch whereby said transistor switch opens upon the reaching of a predetermined level by current in said feedback resistance, resulting in oscillations at a natural frequency;
   catch diode means disposed in parallel with said transistor switch to maintain the voltage across said transistor switch to a predetermined level; and
   including means to control the output voltage of said high voltage power supply including means for comparing the output voltage of said high voltage supply to a predetermined reference to produce an error signal in response to said output voltage reaching the level of said predetermined reference, and cycling means including a voltage-to-time converter responsive to said error signal for producing a brief control signal initiated in time-proportion to the magnitude of the error signal and means responsive to said control signal for operating said base drive circuit to open said transistor switch and initiate a new oscillation cycle within a natural oscillation cycle and prior to the reaching of the predetermined current level in said feedback current.

* * * * *